United States Patent
Osborne et al.

(10) Patent No.: US 9,397,362 B2
(45) Date of Patent: Jul. 19, 2016

(54) MODULAR FUEL CELL POWER SYSTEM

(75) Inventors: Kurt David Osborne, Dearborn, MI (US); Donald Paul Alessi, Vancouver (CA)

(73) Assignee: FORD MOTOR COMPANY, Dearborn, MI (US)

(*) Notice: Subject to any disclaimer, the term of this patent is extended or adjusted under 35 U.S.C. 154(b) by 2208 days.

(21) Appl. No.: 12/355,451

(22) Filed: Jan. 16, 2009

(65) Prior Publication Data
US 2010/0183936 A1   Jul. 22, 2010

(51) Int. Cl.
*H01M 8/04* (2006.01)
*H01M 8/24* (2016.01)

(52) U.S. Cl.
CPC .......... *H01M 8/249* (2013.01); *H01M 8/04014* (2013.01); *H01M 8/04126* (2013.01); *H01M 8/04388* (2013.01); *H01M 8/04395* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 5,171,646 A | 12/1992 | Rohr | |
| 5,573,867 A * | 11/1996 | Zafred et al. | 429/410 |
| 6,127,057 A * | 10/2000 | Gorman | 429/429 |
| 6,677,069 B1 | 1/2004 | Piascik et al. | |
| 2002/0187376 A1 | 12/2002 | Nishiumi | |
| 2002/0192513 A1 * | 12/2002 | Colbow et al. | 429/13 |
| 2003/0027024 A1 * | 2/2003 | Ilo et al. | 429/19 |
| 2003/0082428 A1 | 5/2003 | Boneberg et al. | |
| 2004/0166384 A1 * | 8/2004 | Schafer | 429/17 |
| 2004/0166387 A1 | 8/2004 | Imamura et al. | |
| 2005/0048572 A1 | 3/2005 | Bazzarella | |
| 2005/0095500 A1 | 5/2005 | Corless et al. | |
| 2006/0166053 A1 | 7/2006 | Badding et al. | |
| 2007/0048572 A1 | 3/2007 | Oglesby et al. | |
| 2007/0087241 A1 | 4/2007 | Mulvenna et al. | |
| 2007/0259242 A1 | 11/2007 | Schaevitz et al. | |

FOREIGN PATENT DOCUMENTS

WO    03067693 A2    8/2003

* cited by examiner

*Primary Examiner* — Cynthia K Walls
(74) *Attorney, Agent, or Firm* — Damian Porcari; Brooks Kushman P.C.

(57) ABSTRACT

A modular fuel cell power system includes a coolant source, a reactant source and a plurality of fuel cell modules. Each of the fuel cell modules includes a fuel cell stack and a fluid distribution plant in fluid communication with the reactant source, coolant source and fuel cell stack. The fluid distribution plant controls the flow of reactant between the reactant source and fuel cell stack. The fuel cell stacks are configured to be selectively electrically connected.

5 Claims, 2 Drawing Sheets

MODULAR FUEL CELL POWER SYSTEM

BACKGROUND

A fuel cell is an electrochemical conversion device that produces electricity from a fuel and oxidant that react in the presence of an electrolyte. A single fuel cell may include a membrane electrode assembly and two flow field plates. Single cells may be combined into a fuel cell stack to produce the desired level of electrical power.

A fuel cell may include two electrodes, an anode and cathode, separated by a polymer membrane electrolyte. Each of the electrodes may be coated on one side with a thin platinum catalyst layer. The electrodes, catalyst and membrane together form the membrane electrode assembly.

Gases (hydrogen and air) may be supplied to the electrodes on either side of the membrane through channels formed in the flow field plates. Hydrogen flows through the channels to the anode where the platinum catalyst promotes its separation into protons and electrons. On the opposite side of the membrane, air flows through the channels to the cathode where oxygen in the air reacts with the hydrogen protons which pass through the membrane.

The hydrogen dissociates into free electrons and protons (positive hydrogen ions) in the presence of the platinum catalyst at the anode. The free electrons are conducted in the form of usable electric current through an external circuit. The protons migrate through the membrane electrolyte to the cathode. At the cathode, oxygen from the air, electrons from the external circuit and protons combine to form water and heat.

SUMMARY

A modular fuel cell power system includes a plurality of fuel cell modules. Each of the fuel cell modules includes a fuel cell stack and a fluid distribution plant in fluid communication with the fuel cell stack, and configured to control the flow of reactant and air between reactant and air sources and the fuel cell stack. The fuel cell modules are configured to selectively electrically connect the fuel cell stacks in parallel or series.

A modular fuel cell power system includes a coolant source, a reactant source and a plurality of fuel cell modules. Each of the fuel cell modules includes a fuel cell stack and a fluid distribution plant in fluid communication with the reactant source, coolant source and fuel cell stack. Each of the fluid distribution plants controls the flow of reactant between the reactant source and one of the fuel cell stacks. The fuel cell stacks are configured to be selectively electrically connected.

An automotive modular fuel cell power system includes a plurality of fuel cell stacks, a plurality of fluid distribution plants and a plurality of electrical switches configured to selectively electrically connect at least some of the fuel cell stacks. Each of the fluid distribution plants is in fluid communication with one of the fuel cell stacks and is configured to control the flow of reactant and air to one of the fuel cell stacks.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
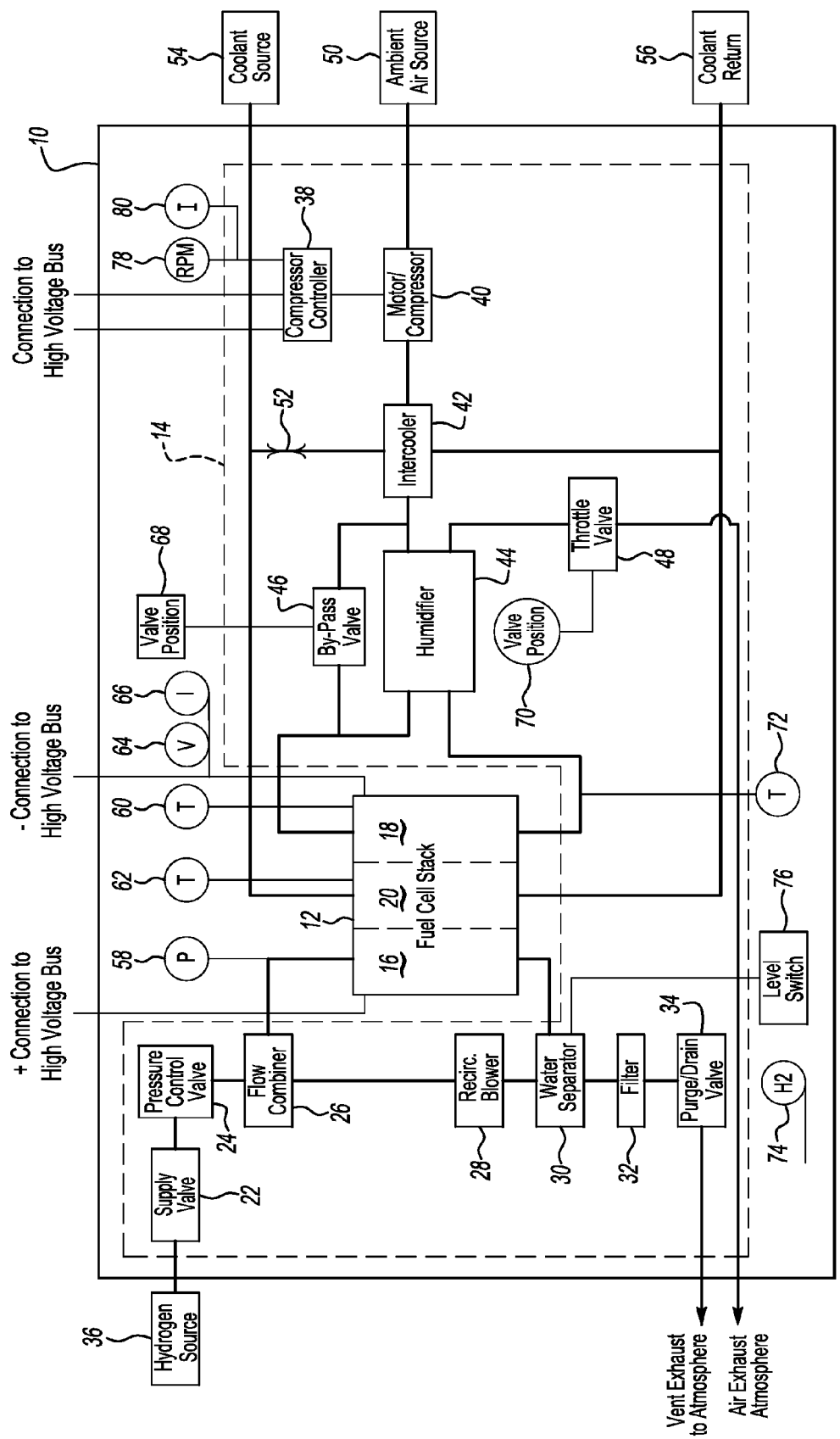
FIG. 1 is a block diagram of an embodiment of a fuel cell module.

Referring now to FIG. 1, an embodiment of a fuel cell module 10 (which may be disposed within a vehicle, but, of course, may be used outside of a vehicle in other embodiments) includes a fuel cell stack 12 and fluid distribution plant 14. As known in the art, the fuel cell stack 12 includes a plurality of fuel cells (not shown). Each of the fuel cells includes an anode 16 and cathode 18 schematically depicted within the fuel cell stack 12. The anodes 16 and cathodes 18 are cooled by a coolant in a coolant line 20. As described in detail below, the fluid distribution plant 14 distributes hydrogen to the anodes 16, air to the cathodes 18 and coolant to the fuel cell stack 12.

The fluid distribution plant 14 of FIG. 1 may include a supply valve 22, pressure control valve 24, flow combiner 26, recirculation blower 28, water separator 30, filter 32 and purge/drain valve 34. Hydrogen from an on-board hydrogen source 36, e.g., a pressurized hydrogen tank, flows through the supply valve 22 to the pressure control valve 24. The pressure control valve 24 controls the pressure of the hydrogen flowing out of the valve 24. The pressure controlled hydrogen then flows through the flow combiner 26, described below, and to the anodes 16 of the fuel cell stack 12.

Un-reacted hydrogen and water vapor may flow out of the fuel cell stack 12 and into the water separator 30. The water separator 30 separates the water vapor from the un-reacted hydrogen. The water vapor may then pass through the filter 32 and be removed from the fuel cell module 10 via the purge/drain valve 34.

The recirculation blower 28 may move the un-reacted hydrogen to the flow combiner 26. The flow combiner 26 may then combine the un-reacted hydrogen with hydrogen from the hydrogen source 36 for delivery to the fuel cell stack 12.

The fluid distribution plant 14 of FIG. 1 may also include a compressor controller 38, motor/compressor 40, intercooler 42, humidifier 44, by-pass valve 46 and throttle valve 48. Air from an ambient air source 50 flows through the motor/compressor 40, under the control of the compressor controller 38, and to the intercooler 42. The intercooler 42 may cool the air to the appropriate temperature, in a known fashion, before delivery to the cathodes 18 of the fuel cell stack 12 by way of the humidifier 44 and/or by-pass valve 46. As apparent to those of ordinary skill, the humidifier 44 may appropriately humidify the air in a known fashion. The by-pass valve 46 may be actuated to partially/completely by-pass the humidifier 44 as conditions dictate.

Air may flow out of the fuel cell stack 12, through the humidifier 44 and be exhausted via operation of the throttle valve 48.

The fluid distribution plant 14 of FIG. 1 may further include a flow orifice 52. Coolant from an on-board coolant source 54 may flow through the flow orifice 52 prior to delivery to the intercooler 42 to alter the flow rate and/or pressure of the coolant. Coolant from the on-board coolant source 54 may also flow through the fuel cell stack 12 to absorb and carry away heat generated by the electrochemical reaction taking place within the fuel cell stack 12. Coolant from the fuel cell stack 12 and intercooler 42 may be directed to an on-board coolant return 56, e.g., a fluidic coupling on-board the vehicle which connects to any main and/or auxiliary cooling system(s).

In other embodiments, the fluid distribution plant 14 may have other similar configurations. For example, an ejector or ejector system may replace the flow combiner 26 and hydrogen blower 28; a contact humidifier or entropy wheel may replace the gas-to-gas humidifier 44; by-pass valve 46 may be deleted; water may be injected into the compressor 40 for cooling thus replacing the intercooler 42; the purge/drain valve 34 may be replaced by individual valves, etc.

In the embodiment of FIG. 1, the fuel cell module 10 may include an anode pressure sensor 58, cathode pressure sensor 60, coolant temperature sensor 62 and voltage and current sensors 64, 66. The sensors 58, 60 detect the pressures associated with the anodes 16 and cathodes 18 respectively. The sensor 62 detects the temperature of coolant in the coolant line 20. The sensors 64, 66 detect a voltage and current respectively associated with the fuel cell stack 12.

The fuel cell module 10 may also include valve position sensors 68, 70. The position sensor 68 detects the position of the by-pass valve 46. The position sensor 70 detects the position of the throttle valve 48. The fuel cell module 10 may further include a temperature sensor 72, hydrogen sensor 74, water level sensor/switch 76 and speed and current sensors 78, 80. The sensor 72 detects the temperature of air exiting the fuel cell stack 12. The sensor 74 detects the presence of hydrogen within the fuel cell module 10. The water level/switch 76 detects the level of water within the water separator 30. The speed and current sensors 78, 80 detect a speed and current respectively associated with the compressor controller 38.

As apparent to those of ordinary skill, information collected by at least some of the sensors 58 through 80 may be used by a controller (not shown) to control, for example, the fuel distribution plant 14. As an example, pressure information detected by the pressure sensor 58 may be used to control the operation, in a known fashion, of the supply valve 22, pressure control valve 24, flow combiner 26, etc. As another example, pressure information detected by the pressure sensor 60 may be used to control the operation, in a known fashion, of the compressor controller 38, motor/compressor 40, etc. Other control scenarios are, of course, also possible. In embodiments having more than one fuel cell module 10, each may have its own controller or may share a common controller. Any suitable arrangement, however, may be used.

The fuel cell stack 12 and compressor controller 38 of FIG. 1 are electrically connected with a high voltage bus (not shown). As apparent to those of ordinary skill, energy output by the fuel cell stack 12 and provided to the high voltage bus may, for example, be stored in a power storage unit (not shown) or used to generate motive power via an electric machine (not shown).

Figure 2:
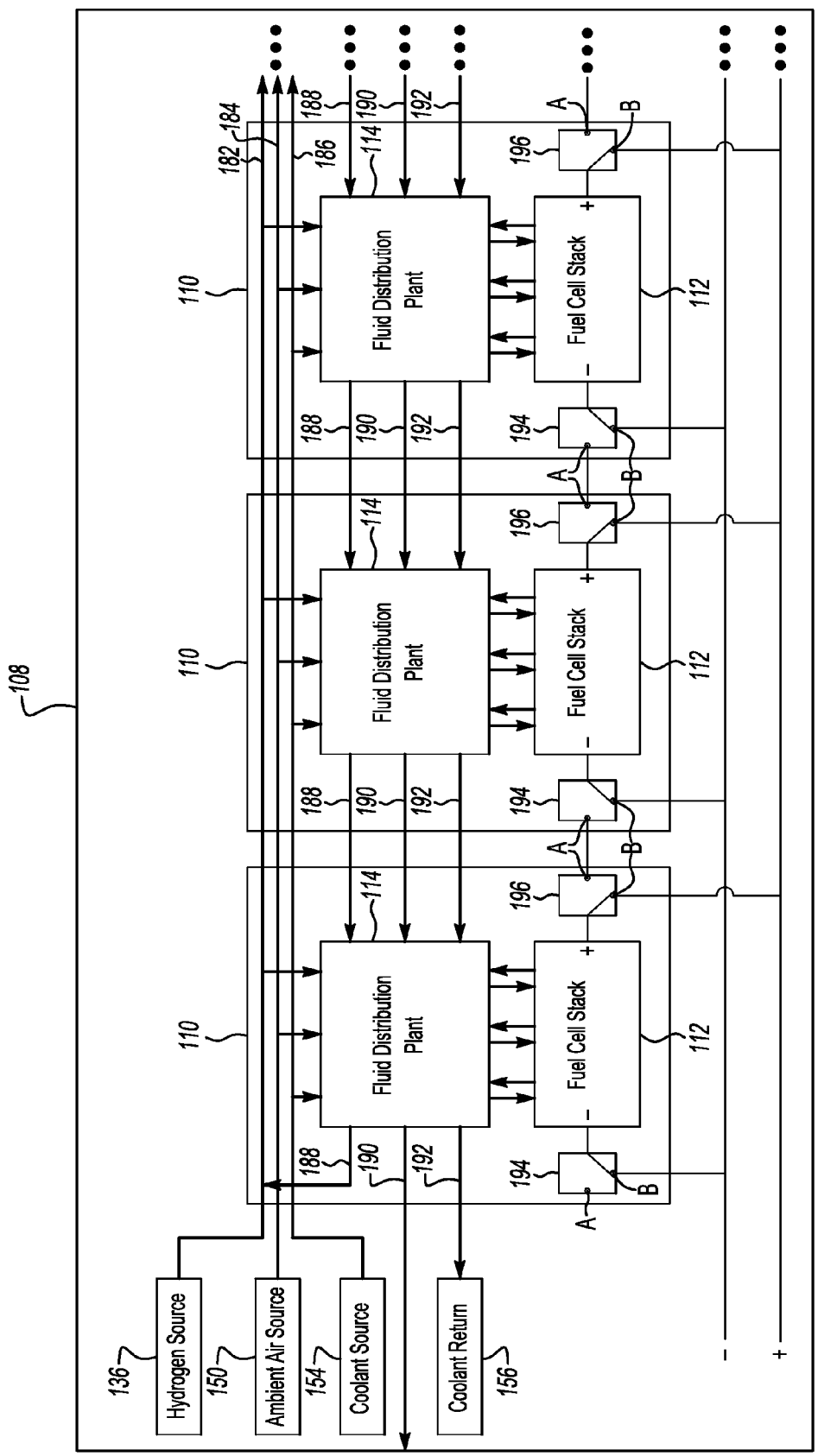
FIG. 2 is a block diagram of an embodiment of a modular fuel cell power system.

Referring now to FIG. 2, numbered elements that differ by 100 relative to the numbered elements of FIG. 1 have similar descriptions to the numbered elements of FIG. 1. An automotive vehicle 108 includes a plurality of fuel cell modules 110. Each of the fuel cell modules 110 includes a fuel cell stack 112 and fluid distribution plant 114. Each of the fluid distribution plants 114 receives hydrogen, air and coolant from a hydrogen source 136, ambient air source 150 and coolant source 154 via a common set of supply lines 182, 184, 186 respectively.

In the embodiment of FIG. 2, the fluid distribution plants 114 are arranged in parallel relative to the sources 136, 150, 154. In other embodiments, however, the fluid distribution plants 114 may be arranged in series relative to the sources 136, 150, 154. In still other embodiments, each of the fluid distribution plants 114 may receive fluids from the sources 136, 150, 154 via a dedicated set of supply lines. Other configurations are also possible. Valves (not shown) may also be positioned within the flow path of the supply lines 182, 184, 186. In such embodiments, fluid supply from the sources 136, 150, 154 to any one of the fluid distribution plants 114 may be selectively turned on or off.

The fluid distribution plants 114 exchange hydrogen, air and coolant (as indicated by arrow) with the fuel cell stacks 112 in a manner similar to that described with respect to FIG. 1.

Return lines 188, 190, 192 form a return loop through the fluid distribution plants 114 for each of the hydrogen, air and coolant respectively. The return line 188 of FIG. 1 is configured to re-circulate hydrogen back to the supply line 182 in a known fashion. The return line 190 for the air is exhausted to the exterior of the vehicle 108. The return line 192 for the coolant provides the coolant to a coolant return 156. Any suitable fluidic configuration, however, may be used.

Each of the fuel cell modules 110 of FIG. 1 also includes switches 194, 196. In other embodiments, the switches 194, 196 may reside outside of the fuel cell modules 110 in any suitable location. Each of the switches 194 is associated with a negative side of one of the fuel cell stacks 112. Each of the switches 196 is associated with a positive side of one of the fuel cell stacks 112. The switches 194, 196, of course, may take any suitable form.

To facilitate discussion, each of the switches 194, 196 has a terminal labeled "A" and a terminal labeled "B." As explained in detail below, each of the fuel cell stacks 112 may be electrically connected in series, parallel or by-passed through operation of the switches 194, 196.

As illustrated in FIG. 2, the switches 194, 196 are configured to electrically connect the fuel cell stacks 112 in parallel. That is, positive terminals of each of the fuel cell stacks 112 are electrically connected together via the switches 196 and negative terminals of each of the fuel cell stacks 112 are electrically connected together via the switches 194. As apparent to those of ordinary skill, the switches 194, 196 may also be configured to electrically connect the fuel cell stacks 112 in series via the respective "A" terminals (except, of course, for the switch 194 associated with left most illustrated fuel cell module 112 whose switching configuration would remain the same.) As apparent to those of ordinary skill, certain switches 194, 196 may be configured to electrically by-pass certain of the fuel cell stacks 112. As discussed above, the electrical output of the fuel cell stacks 112 may be stored in a power storage unit (not shown) or used to generate motive power via, for example, an electric machine (not shown).

In certain embodiments, the fuel cell stacks 112 and fluid distribution plants 114 may be selectively by-passed through the control of the valves (described above) associated with the supply lines 182, 184, 186 and the switches 194, 196. As apparent to those of ordinary skill, this control may be performed by a controller (not shown) in communication with the valves and switches 194, 196. Such by-passing may be performed to bring the fuel cells modules 110 on and/or off line as conditions dictate. As an example, a low driver demand for power may require only the operation of a single fuel cell module 110. Any other fuel cell modules 110 may be taken off line. As another example, a fuel cell module 110 experiencing an operational issue may be taken off line. As yet another example, high driver demand for power may require the operation of all fuel cell modules 110.

References to hydrogen as noted herein generally includes hydrogen-rich gases such as reformates. In addition, the oxygen in the airstream may include various types of oxygen generated by oxygen enrichment methods. While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed:

1. A modular fuel cell power system comprising:
a plurality of fuel cell modules each including a fuel cell stack and a fluid distribution plant in fluid communication with the fuel cell stack and configured to control the flow of reactant and air between reactant and air sources and the fuel cell stack, the fuel cell modules configured to selectively electrically connect the fuel cell stacks in parallel during certain periods and series during other periods.

2. The system of claim 1 wherein each of the fuel cell modules includes at least one electrical switch and wherein the fuel cell stacks are selectively electrically connected via the electrical switches.

3. The system of claim 1 wherein the fluid distribution plants each include a humidifier to humidify the air prior to the air entering the respective fuel cell stacks.

4. The system of claim 1 wherein the fluid distribution plants each include an intercooler to cool the air prior to the air entering the respective fuel cell stacks.

5. The system of claim 1 wherein the fluid distribution plants each include a pressure control valve to control a pressure of the reactant from the reactant source.

* * * * *